Figure 1:
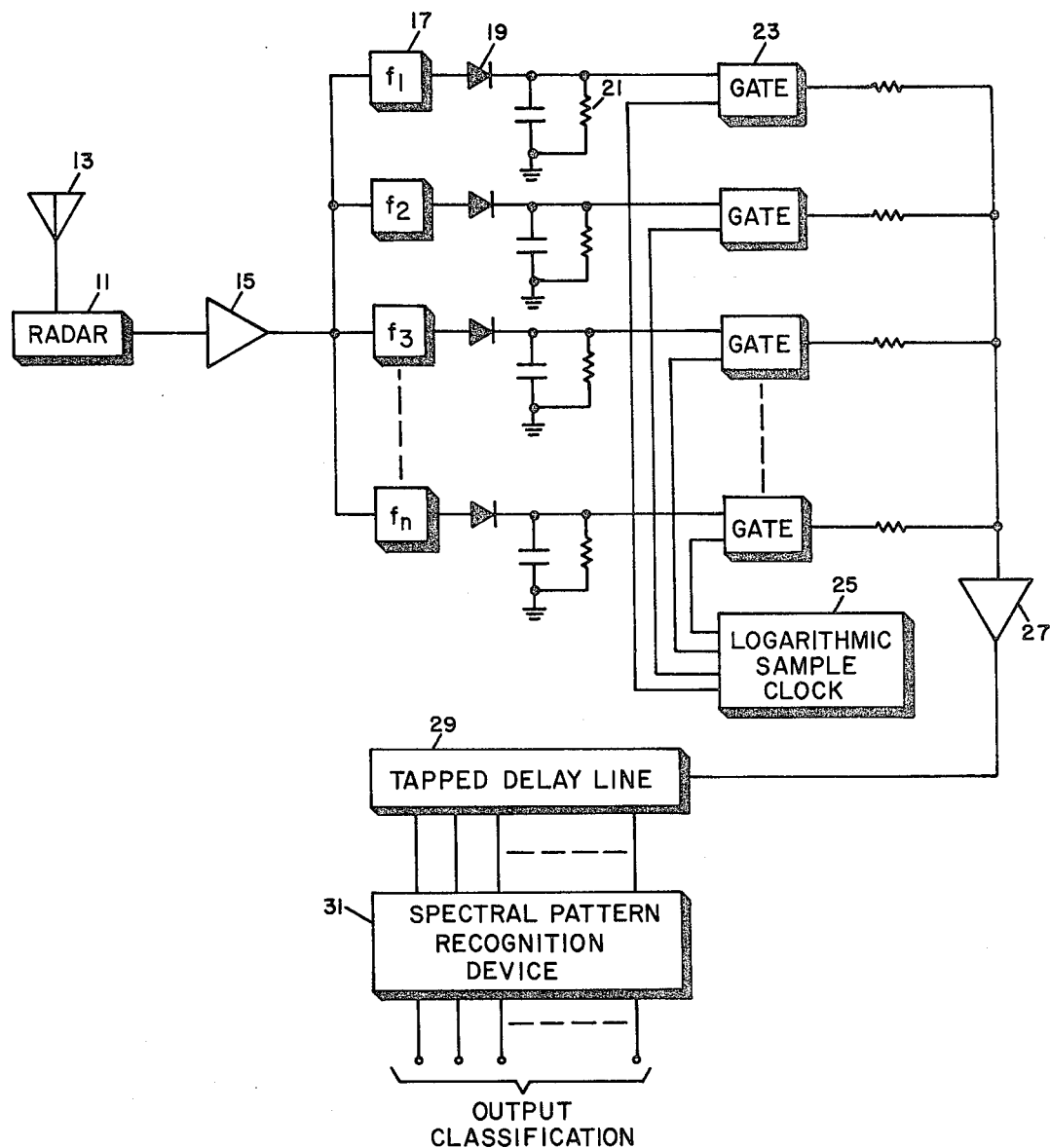

United States Patent [19]

Uffelman

[11] 4,241,350
[45] Dec. 23, 1980

[54] RADAR TARGET PATTERN RECOGNITION SYSTEM USING LOGARITHMIC ANALYSIS

[75] Inventor: Malcolm R. Uffelman, Vienna, Va.

[73] Assignee: Scope, Inc., Reston, Va.

[21] Appl. No.: 206,957

[22] Filed: Dec. 10, 1971

Related U.S. Application Data

[63] Continuation of Ser. No. 479,083, Aug. 12, 1965, abandoned.

[51] Int. Cl.³ .............................................. G01S 7/44
[52] U.S. Cl. ................................................ 343/5 SA
[58] Field of Search ................... 343/100 CL, 8, 5 SA

[56] References Cited

U.S. PATENT DOCUMENTS

| | | | |
|---|---|---|---|
| 3,150,363 | 9/1964 | Finvold | 343/5 SA |
| 3,202,968 | 8/1965 | Eady, Jr. et al. | 343/5 R |
| 3,371,197 | 2/1968 | Munson | 343/100 CL |

*Primary Examiner*—Malcolm F. Hubler
*Attorney, Agent, or Firm*—John E. Benoit

[57] ABSTRACT

A radar target pattern recognizer which extracts a predetermined frequency range from a radar signal representation. A spectrum analysis is performed on the signal and then displayed relative to a logarithmic frequency scale with a subsequent comparison of the output with known target patterns.

11 Claims, 8 Drawing Figures

RADAR TARGET PATTERN RECOGNITION SYSTEM USING LOGARITHMIC ANALYSIS

This is a continuation of application Ser. No. 479,083, filed Aug. 12, 1965, now abandoned, in the name of Malcolm R. Uffelman.

This invention relates generally to a radar target pattern recognition system and more particularly to a system for recognition of a target which has an effective radar target cross section which varies periodically with time.

An example of a target which has an effective radar cross section which varies in a periodic manner is a propeller driven aircraft. A discussion of the target cross section effect of a propeller driven aircraft may be found in "Introduction to Radar Systems" by Merril I. Skolnik pages 79 and 80. It is pointed out therein that the echo signal from a propeller driven aircraft also contains modulation components at a frequency proportional to the propeller rotation. The spectrum produced by propeller modulation is similar to that produced by a sine wave signal and its harmonics. Also, the frequency range of propeller modulation is dependent upon the shaft rotation speed and the number of propeller blades involved. The above reference discusses this modulation on the basis of a potential source of difficulty as to basic radar operation.

The cause of this amplitude modulation effect can be understood as follows:

If: $h(t)$ is the radar signal incident upon a target, and
$c(t)$ is the radar cross section of the target which is a periodic function of time,
then the reflected signal $r(t)$ is defined as follows:

$$r(t) = h(t) \, c(t)$$

Since this equation is simply that of the ordinary AM modulation effect, if a CW radar is used, the transmitted signal has the following general form:

$$h(t) = A \sin (\omega_0 t + \phi)$$

wherein
A is a constant
$\omega_0$ is the radar frequency, and
$\phi$ is the phase angle.

The return signal will have the followng form:

$$r(t) = A \, c(t) \sin (\omega_0 t + \phi)$$

It is well known that the spectrum of $r(t)$ is centered at $\phi_0$ and has upper and lower side bands as determined by $c(t)$.

As an example, a propeller airplane's radar cross section may hve a DC term and a component at $\omega_1$ and $\omega_2$. Therefore the return spectrum will have components at $\omega_0$, $\omega_0 + \omega$, $\omega_0 + \omega_2$, $\omega_0 - \omega_1$, and $\omega_0 - \omega_2$.

Further, if the airplane has a motion along a radial line from the radar there will also be a doppler shift proportional to the velocity along the radial line.

In any one of the conventional detection processes, the video spectrum has a DC term proportional to the returned carrier plus the spectral lines at $\omega_1$ and $\omega_2$. Therefore, the returned signal has terms which describe the particular radar target cross section fluctuations.

Broadly speaking the present invention relates to a system comprising means for accepting an input as described above from the radar and extracting a predetermined frequency range therefrom, means for performing a spectrum analysis of this frequency range, means for displaying this spectrum on a logarithmic base, and a pattern recognition device for identifying the resultant spectrum pattern.

A basic object of the invention is the identification of a target by means of recognition of the effective radar target cross section as it varies periodically with time.

Figure 2:
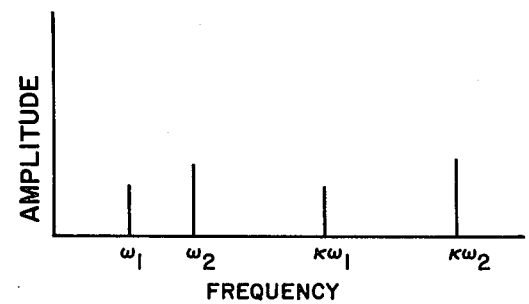
Figure 3:
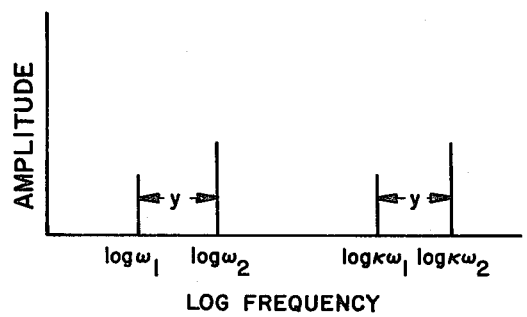
Figure 4:
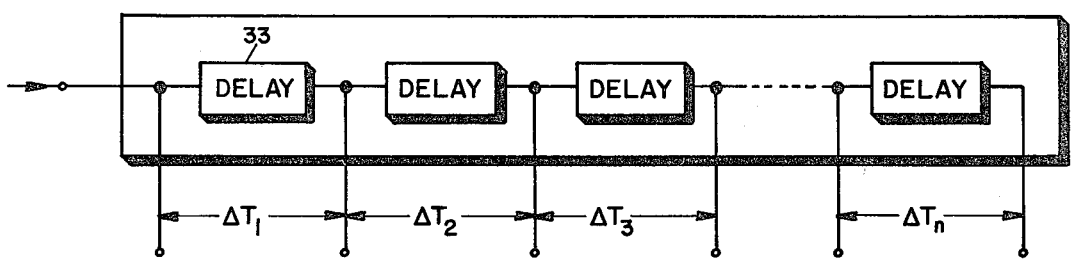
Figure 5:
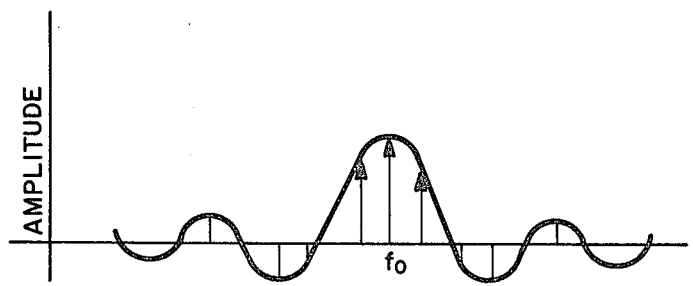
Figure 6:
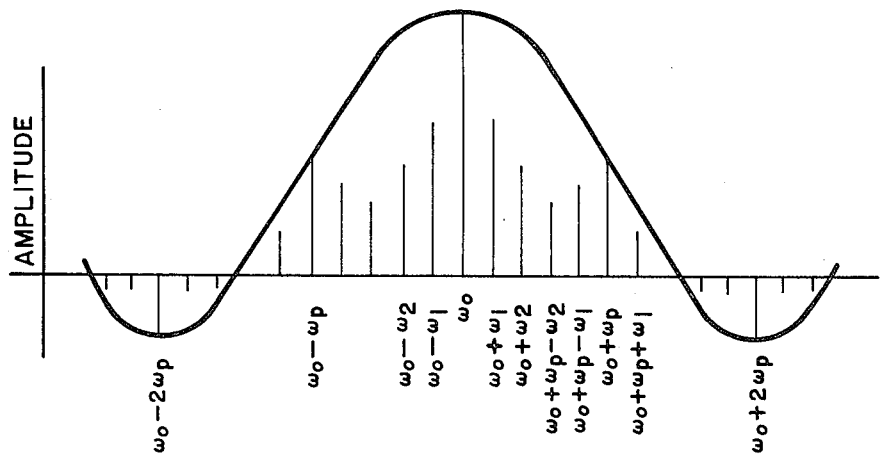
Figure 7:
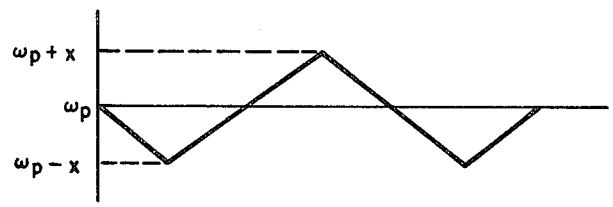
Figure 8:
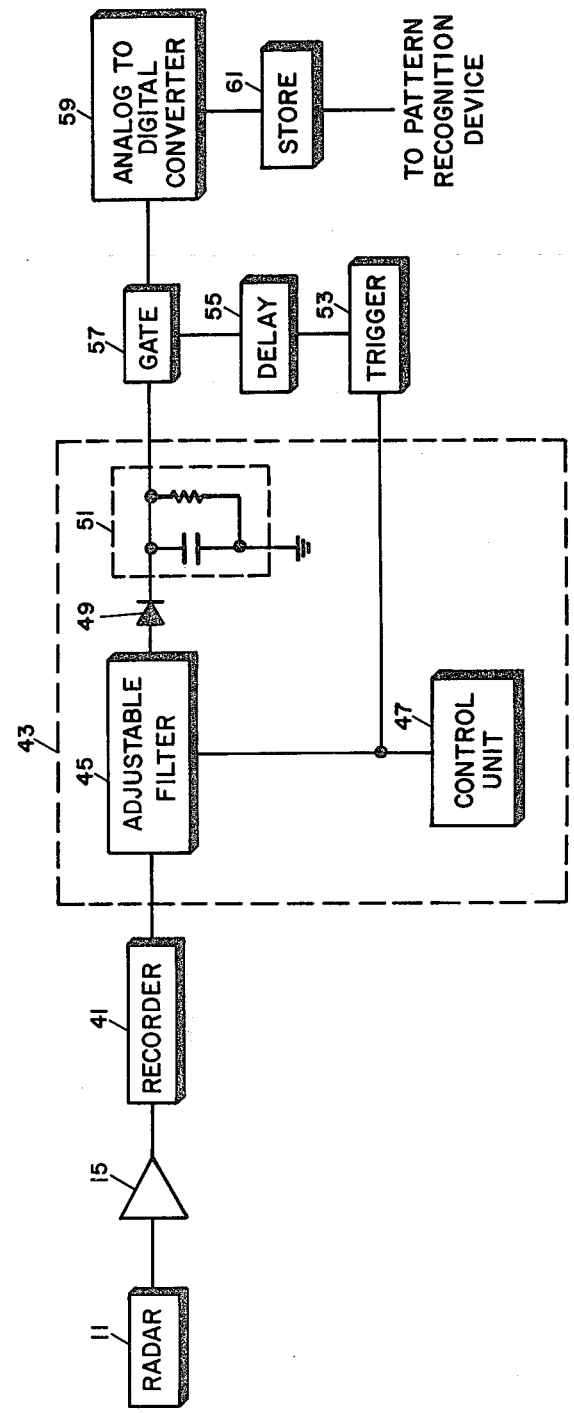

The invention will be understood from the following duscussion when taken in conjunction with the drawings wherein FIG. 1 is a schematic diagram of an illustrative embodiment of the present invention, FIGS. 2 and 3 are graphical representations relating to the amplitude and frequency of the return signal, FIG. 4 is a schematic diagram of one type of display medium, FIGS. 5-7 are illustrative graphs relating to the use of pulse radar systems, and FIG. 8 is a schematic diagram of a further illustrative embodiment of the invention.

Turning now more specifically to the drawings, the invention will first be discussed relative to the use of a CW radar system. In FIG. 1 the radar 11 together with the associated antenna 13 has a video output to a preprocessor 15. The function of the preprocessor is to remove any doppler and other unwanted return frequencies from the video output. In the particular illustration of FIG. 1, the preprocessor is a buffer amplifier which in turn supplies an output to a filter bank having a plurality of filters 17. The filters are coupled to associated detectors 19 and smoothing filters 21. The function of the filters, detectors, and smoothing filters is to produce a time average spectrum of the signal coming from the buffer amplifier 15. Each filter has substantially equal passbands and the center frequencies of each filter are set a passband above the preceeding filter. The output from the smoothing filters produces the spectrum of the detected return signal $r(t)$.

Each smoothing filter 21 is followed by an analogue sample gate 23. Any well known sample gate may be used such as that shown and discussed in "Pulse and Digital Circuits" by Millman and Taub, Chapter 14.

The sample gates are interrogated by clock pulses from the sample clock 25. One of the problems in pattern recognition is a possible shift in the spectrum which is not related to the actual target identity. In the present example of a propeller driven aircraft, the spectral lines are a function of the number of blades on each shaft and the shaft rpm. Therefore, if the rpm changes, the location of the spectral lines will change. Since this is a multiplicative function, then the target pattern also changes even though the target remains the same. The solution to this problem is to produce a frequency scale which is logarithmic rather than linear.

One means for producing this logarithmic frequency scale is to use a logarithmic sample clock which produces clock pulses emitted at times proportional to $\log_{10}(T-t)$ wherein $$1 \leq (T-t) \leq T$$

T is a constant equal to the length of time required to scan the sample gates, and
t is the real time.

The pulses from the sample clock first sample the highest frequency filter and then proceed to the lower valued filters. The actual sample pulse width is less than the minimum dwell time so that the output of summing amplifier 27 will be a series of equal width pulses spaced according to a log scale with the individual amplitudes controlled by the average energy in the associated filter.

Another method of accomplishing this same type of result would be to load the signals from the sample gates, in parallel, into the taps of a delay line, with the taps laid out in a log fashion. The output is then taken from a single end tap. It will be obvious that any method of extracting the spectrum on a log base may be used.

FIGS. 2 and 3 illustrate that this method of extracting the spectrum on a log base solves the problem of multiplicative scale changes. FIG. 2 illustrates the case of a propeller driven plane wherein the rpm changes and only a linear output is used. If the plane is flying originally at a specific shaft rpm designated as x, spectral lines $\omega_1$ and $\omega_2$ will appear as shown. If the rpm of the shaft is increased by an amount kx, the spectral lines will move to $k\omega_1$ and $k\omega_2$ as shown and will produce a different pattern even though the target itself has not changed.

FIG. 3 illustrates that if the log base is used, the new spectrum will become $\log k + \log \omega_1$ and $\log k + \log \omega_2$. Since the original spectrum was $\log \omega_1$ and $\log \omega_2$, the pattern remains the same as illustrated by the same distances x between the spectral lines. In effect, the pattern is merely shifted in position, i.e., translated by the amount of log k. The log base therefore preserves harmonic relationships as equal distances and maintains the shape of the spectrum pattern.

The spectrum output of the summing amplifier 27, FIG. 2, is fed to a delay device 29. If an analogue delay device such as a lumped constant tapped delay line is used, the signal can be directly transferred to it.

However, if a digital device such as a parallel coded set of shift registers is used, an analogue to digital converter is required. Any standard analogue to digital converter may be used.

In the present recognition system there is a fixed number of filters depending on the particular application, and these filters have a fixed time relationship with respect to the sampling. Therefore, signals can only appear at given points in time and it is necessary to supply taps, or viewing spots, on the delay device at only certain points.

Referring to FIG. 4, the number of taps is equal to the number of filters and they are arranged in a log fashion. Thus, $\Delta T_1$ is equal to the time between the sampling of the lowest frequency filter and the next highest filter. $\Delta T_2$ is equal to the time between the last named filter and the next highest filter, and so on. Therefore, if the signals which appear at the taps are viewed in parallel, any spectrum will appear in all translations as it propagates down the delay device. This is equivalent to testing, or viewing, the spectrum in all possible shaft rpm's in the particular propeller driven airplane illustration.

Accordingly, the parallel display from the delay medium will, at some time during the sampling and propagation of the spectrum, display it in a standard previously selected position.

The output of the delay medium is then fed to a pattern recognition device 31. There are a number of devices available which can be used to recognize these spectral patterns. One such preferred device is shown and described in copending patent application Ser. No. 217,350 entitled "System for Classifying Minimumally Constrained Stimuli" filed Oct. 26, 1961 and assigned to the assignee of the present application. This system is also described in an article in *International IRE Convention,* Vol. 10, Part 4 entitled "Conflex I—A Conditional Reflex System" by Malcolm R. Uffelman. Basically, this is a system that learns to recognize patterns by being trained with typical examples of the classes of patterns it must be able to identify.

A further problem arises if a pulse radar is used. In that case the frequency components arising from the modulation of the pulse carrier sidebands may be folded into the region of interest around the fundamental doppler shift.

In considering this problem the following convolution relationship will be used:

$$R(j\omega) = \int_{-\infty}^{+\infty} H(j\alpha)C(j[-\alpha + \omega])d\alpha$$

where:

$R(j\omega)$ is the Fourier transform of $r(t)$
$H(j\omega)$ is the Fourier transform of $h(t)$
$C(j\omega)$ is the Fourier transform of $c(t)$ The above equation gives the spectral content at each frequency involved. In the case of the pulsed radar, the spectrum of h(t) has the well known sin x/x envelope with spectral lines separated by the pulse repetition frequency, $\omega_p$. Defining $\omega_0 = 2\pi f_0$, the envelope will be as illustrated in FIG. 5.

Using the above convolution integral, it can be shown that each of these spectral lines serves as a carrier and is amplitude modulated by c(t).

FIG. 6 is an illustration of one example wherein $\omega_p$ is the pulse repetition rate and $\omega_p > \omega_1$ and $\omega_2$, which are the spectral lines of c(t).

As can be seen from FIG. 6, in the pulse radar case, the return spectrum can be quite complex due to the transmitted sidebands and their modulation. These components of the spectrum are in effect a noise which obscures the signal.

This noise problem can be reduced by using a radar containing a "jitter." In effect, this "jitter" is a means for continually shifting the pulse repetition frequency a fraction of the standard pulse interval.

It is noted that the detection system in the radar can always return the carrier to DC. However, if the transmitted signal is "jittered" in pulse rate, the spectral lines of the transmitted signal, with the exception of the carrier line, will move an amount proportional to the "jitter. " If the jitter is ±x pulses per second and it is applied as a ramp as shown in FIG. 7, then the $\omega_0 + \omega_p$ line will move uniformly around in the region $$\omega_0 + \omega_p - x \leq \omega \leq \omega_0 + \omega_p + x.$$

The line at $\omega_0 + 2\omega_p$ will move uniformly in the region $$\omega_0 + 2\omega_p - 2x \leq \omega \leq \omega_0 + 2\omega_p + 2x.$$

In general, the line at $\omega_0 + \nu\omega_p$ will move uniformly in the region $$\omega_0 + \nu\omega_p - \nu_k \leq \omega \leq \omega_0 + \nu\omega_p + \nu x.$$

Not only will the spectral lines due to the radar pulse move, their side bands due to modulation by c(t) will also move by the same amount. Therefore, only the DC term and its sidebands will remain fixed.

Accordingly, the energy in each filter due to the pulse spectral lines and their side bands will be reduced while the DC components and the modulation side bands will contribute energy only to the proper filters. The noise lines are reduced proportionately to the number of filters covered by each noise line. Stated another way, the noise terms must contribute energy only to the proper filters.

The selection of the jitter range and rate depends on the pulse repetition rate of the radar and the bandwidth of the c(t) expected. It is obvious that a sine wave or other shaped jitter could be used.

The available known target patterns are supplied to the pattern recognition device so that the spectral patterns from the display medium may be classified according to such standards.

Another illustrative embodiment of the invention is shown schematically in FIG. 8. In this system the output of amplifier 15 is fed to a recorder which may be any of the well known types of recorders for storing information input over a period of time and subsequently supplying such information in a repetitive manner as an output to a utilization device.

Such a utilization device 43 is shown within the dotted lines. In the particular illustration, this device may be a selected part of a spectrum analyzer commercially available under the trade name Sona-Graph as manufactured by the Kay Electric Company and described in U.S. Pat. No. 2,615,078. This device provides a spectrum analysis through the use of a single adjustable filter 45 which is scanned in accordance with the signals from control unit 47. Control unit 47 may be a device which scans the filter in a logarithmic manner. The output of filter 45 is again put through detector 49 and smoothing filter 51.

A trigger 53 is also coupled to the output of the control unit 47 and supplies the signal to the gate 57 will be triggered at the termination of such dwell time.

Additionally, FIG. 8 shows the use of an analog-to-digital converter 59 to supply to the information to the store and display means 61 as described above.

It is to be understood that the present invention is applicable to the recognition of the radar target pattern of any target with an effective cross section which varies periodically with time. Accordingly, the above description and the associated drawings are but illustrative of practical embodiments and the invention is to be limited only by the scope of the following claims.

I claim:

1. A target pattern recognition system comprising,
    radar means for detecting a target,
    a parallel bank spectrum analyzer,
    coupling means for delivering the radar output to the input of said analyzer,
    means coupling the output of said analyzer to said last named means for sampling the output of said analyzer relative to a logarithmic frequency base,
    a pattern recognition device, and
    means coupling the sampled output of said analyzer to said pattern recognition device.

2. The system of claim 1 wherein said radar means comprises a pulsed radar including means for continually shifting the pulse repetition frequency a fraction of the standard pulse interval.

3. The system of claim 1 wherein said parallel bank spectrum analyzer comprises a plurality of filter-detector circuits each tuned to a preselected frequency range.

4. The system of claim 1 wherein said means coupling the output of said analyzer to said means for producing a logarithmic frequency scale comprises a plurality of sampling gates and a logarithmic sample clock coupling to and controlling said gates.

5. A target pattern recognition system comprising,
    radar means for detecting a target,
    means coupled to the output of said radar means for selecting a predetermined frequency range within said output,
    means for performing a spectrum analysis of said predetermined frequency range,
    means coupling said last two named means for displaying said analyzed spectrum relative to a logarithmic frequency scale, and
    pattern recognition means coupled to the output of said displaying means.

6. The system of claim 5 wherein said radar means comprises a pulsed radar including means for continually shifting the pulse repetition frequency a fraction of the standard pulse interval.

7. A target pattern recognition system comprising,
    radar means for detecting a target,
    a plurality of filters within a parallel filter bank coupled to the output of said radar means, each of said filters having substantially identical pass bands with the center frequency of each filter set a pass band above the preceeding filter,
    a plurality of sampling gates equal in number to said filters,
    detector means for couling each of said filters to a corresponding sampling gate,
    a logarithmic sample clock coupled to and controlling each of said sample gates,
    a summing amplifier coupled to the output of said gates,
    a tapped delay line coupled to the output of said summing amplifier, and
    a spectral pattern recognition device coupled to the output of said tapped delay line.

8. A target pattern recognition system comprising,
    radar means for detecting a target,
    a logarithmic spectrum analyzer,
    coupling means for delivering a predetermined frequency range within the output of said radar means to the input of said analyzer,
    means coupled to the output of said analyzer for sampling the output of said analyzer,
    means for displaying said sampled analyzed spectrum, and
    pattern recognition means coupled to the output of said displaying means.

9. The system of claim 8 further comprising,
    recording means coupled between said radar means and said spectrum analyzer for storing the information input from said radar means and subsequently supplying such information as an output to said spectrum analyzer.

10. A target pattern recognition system comprising,
    means for supplying a radar signal representation of said target,
    means coupled to the output of said first named means for selecting a predetermined frequency range within said output,
    means for performing a spectrum analysis of said predetermined frequency range, means coupling said last two named means for displaying said analyzed spectrum relative to a logarithmic frequency scale, and
means for comparing the output of said displaying means with known target patterns.

11. A target pattern recognition system comprising,
means for providing a predetermined frequency range within a radar signal representation of said target,
means for performing a spectrum analysis of said predetermined frequency range,
means for displaying said analyzed spectrum relative to a logarithmic frequency scale, and
means for comparing the output of said displaying means with known target patterns.

* * * * *